June 12, 1928.

A. A. VIGNOS 1,673,475

KEY PURSE

Filed Oct. 21, 1925

Inventor

Alfred A. Vignos

By Frank M Bond

Attorney

Patented June 12, 1928.

1,673,475

UNITED STATES PATENT OFFICE.

ALFRED A. VIGNOS, OF CANTON, OHIO, ASSIGNOR TO THE NOVELTY CUTLERY COMPANY, OF CANTON, OHIO, A CORPORATION OF OHIO.

KEY PURSE.

Application filed October 21, 1925. Serial No. 63,880.

The invention relates to purses for carrying keys, and the object of the improvement is to provide a purse formed of two leaves of leather, or similar material, arranged to be detachably connected together, to enclose a plurality of keys in flatwise position, one of the leaves having a tubular post to receive the openings in the heads of the keys, the other leaf carrying a stem arranged to be detachably secured within said tubular post and normally held against withdrawal therefrom; the post being so constructed that any desired key may be swung upon the same and removed from between the leaves, while the remaining keys may be retained within the purse.

Figure 1:
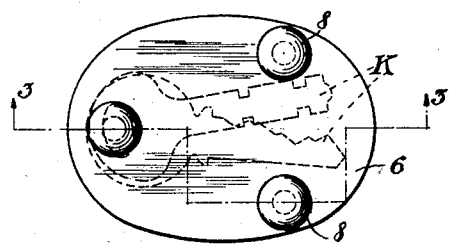
Figure 2:
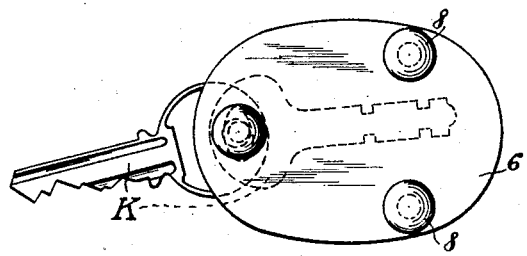
Figure 3:
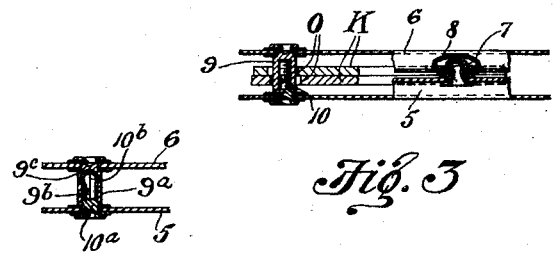

An embodiment of the invention is illustrated in the accompanying drawing, in which Figure 1 is a plan view of the purse showing the keys, in dotted position, retained therein;

Fig. 2, a similar view showing one key swung outward upon the post while the other key is retained within the purse;

Fig. 3, a section on the line 3—3 Figure 1, and

Figure 4:

Fig. 4, a fragmentary sectional view showing a modified form of post.

Similar numerals refer to similar parts throughout the drawing.

The purse is formed of two similar leaves 5 and 6, of leather or similar material. These leaves are preferably of substantially oval shape and are arranged to be detachably connected together near one end portion.

This connection of the leaves may be accomplished by providing headed studs 7, at opposite sides of the lower leaf 5, near one end thereof, to be engaged by the snap fasteners 8 carried by the upper leaf 6.

A tubular, internally threaded post 9 is carried at the opposite end portion of one of the leaves and arranged to receive the threaded stem 10 which is fixed to the other leaf.

The keys, indicated at K are arranged to be normally located flatwise, between the leaves, the usual openings 0, in the head portions of the keys, receiving the post 9, the snap fasteners 8 being normally engaged with the studs 7, in order to hold the keys enclosed between the leaves, as shown in Fig. 2.

In placing the keys within the purse, the leaves are first separated and the openings in the heads of the keys are engaged over the post 9 after which the threaded stem 10 is inserted into the internally threaded bore of the post, the leaf carrying said threaded stem being turned around about the post until the stem is screwed entirely into the same. The keys are moved into position between the two leaves and the snap fasteners 8 are engaged with the studs 7, retaining the keys in position between the leaves.

When it is desired to use one of the keys, either of the snap fasteners may be disconnected and the desired key swung outward from between the leaves, as shown in Fig. 2. The device is particularly adaptable for use in carrying the switch key of an automobile, as the switch key may thus be swung out from between the leaves and the snap fastener again fastened retaining the other keys between the leaves of the purse, while the switch key is located in the switch.

In this case the purse, carrying the other keys, will hang suspended from the switch key, and will prevent the usual jangling and rattling of the keys against the instrument board of the automobile and prevent marring of the same, as only the leather leaves of the purse will contact with the instrument board.

With this construction it will be seen that there is no possibility of accidental disengagement of the threaded stem and post, because, since the threaded stem is fixed upon one leaf it is necessary that this leaf be rotated around the post a sufficient number of turns to disengage the threads, and as at least one of the snap fasteners is normally engaged with its co-operating stud, there can be no relative movement of the leaves.

In Fig. 4 is shown a modification of the post and stem construction. In this form of the invention the post $9^a$ has a central bore $9^b$ terminating at its inner end in an enlarged socket $9^c$. The stem $10^a$ is carried by the other leaf and as illustrated in the drawing is hollow, and of any suitable spring construction, and provided with the enlarged head $10^b$, arranged to be normally received in the socket $9^c$ of the post.

This stem is snapped into the bore of the post, and cannot be easily displaced, requiring a considerable pull to remove the same from the post, thus obivating the possibility of accidental disengagement while at the same time permitting for insertion or removal of keys from the post.

I claim:

1. A key purse comprising a pair of separable leaves between which keys are adapted to be housed, an internally threaded post permanently attached to one leaf, upon which the keys are arranged to be mounted, and a threaded stem permanently attached to the other leaf for engagement in said post.

2. A key purse comprising a pair of separable leaves between which keys are adapted to be housed, an internally threaded post permanently attached to one end portion of one leaf, upon which the keys are arranged to be mounted, a threaded stem permanently attached to the adjacent end portion of the other leaf for engagement in said post, and means for connecting the other end portions of the leaves together.

3. A key purse comprising a pair of separable leaves between which keys are adapted to be housed, an internally threaded post permanently attached to one end portion of one leaf, upon which the keys are arranged to be mounted, a threaded stem permanently attached to the adjacent end portion of the other leaf for engagement in said post, and means for detachably connecting the other end portions of the leaves together.

In testimony that I claim the above, I have hereunto subscribed my name.

ALFRED A. VIGNOS.